United States Patent [19]

Duck

[11] Patent Number: 4,671,784
[45] Date of Patent: Jun. 9, 1987

[54] AUTOMATIC TUBE PROCESSING APPARATUS

[75] Inventor: Michael H. Duck, Adairsville, Ga.

[73] Assignee: Coronet Industries, Inc., Atlanta, Ga.

[21] Appl. No.: 797,128

[22] Filed: Nov. 12, 1985

[51] Int. Cl.⁴ ............... B31C 11/02; B23Q 16/02; B23Q 16/06

[52] U.S. Cl. .................. 493/29; 493/21; 493/22; 493/30; 493/291; 493/365; 74/813 C; 279/1 E; 408/37; 82/48

[58] Field of Search ............... 413/70; 279/1 E; 493/291, 287, 352, 365, 395, 467, 471, 8, 22, 29, 30; 72/71, 94, 125, 126; 408/1 R, 37, 41, 45, 8, 71; 74/813 C; 82/48

[56] References Cited

U.S. PATENT DOCUMENTS

| Re. 28,872 | 6/1976 | Laika | 72/71 |
|---|---|---|---|
| 1,383,839 | 7/1921 | Mueller | 72/71 |
| 2,014,706 | 9/1935 | Sullivan | 413/70 |
| 2,404,161 | 7/1946 | Bower | 408/71 |
| 2,639,647 | 5/1953 | Berenson | 493/291 |
| 2,714,412 | 8/1955 | Trandle | 72/71 |
| 3,044,367 | 7/1962 | Thiel | 408/37 |
| 3,228,224 | 1/1966 | Anderson | 72/123 |
| 3,464,327 | 9/1969 | Yovanovich | 493/291 |
| 3,519,050 | 7/1970 | Dobrinen | 408/37 |
| 3,648,500 | 3/1972 | Vaill | 72/71 |
| 3,852,016 | 12/1974 | Delauzun | 425/393 |
| 4,006,650 | 2/1977 | Elmer | 74/813 C |
| 4,398,407 | 8/1983 | DeFay, Jr. | 72/75 |

FOREIGN PATENT DOCUMENTS 328765  5/1930  United Kingdom ............... 493/291

Primary Examiner—Frederick R. Schmidt
Assistant Examiner—William E. Terrell
Attorney, Agent, or Firm—Fleit, Jacobson, Cohn & Price

[57] ABSTRACT

An automatic paper board tube reamer apparatus includes a tube index and feed assembly and a pair of tube end reamers. The reamers automatically simultaneously square the tube end surfaces and ream the internal diameter of each end of a tube aligned therewith by the feed assembly. The feed assembly automatically feeds the tube to the reamers and ejects the reamed tubes. The reamers and feed assembly operate alternatively and continuously to recycle damaged tubes fed thereto.

8 Claims, 9 Drawing Figures

AUTOMATIC TUBE PROCESSING APPARATUS

This invention relates to an automatic paper tube processing apparatus for restoring a damaged tube core diameter and end face.

Relatively stiff paper board tubes support yarn windings in various stages of the yarn spinning process. In a typical spinning plant, the yarn is produced from fibers which are processed into yarns wound onto the tubes. Subsequent manufacturing steps require that the yarn be periodically unwound and rewound requiring frequent manual tube handling. Further, yarn spinning is a high volume process wherein thousands of tubes can be handled in one manufacturing plant in a daily operation. Each winding may comprise several pounds of yarn which contributes to the eventual tube damage.

The spools of yarn, including their paper board tubes, during yarn manufacturing, are required to be mounted on spindles. The spindles include cups or other tube supporting elements which are closely received in the tube core at each tube end and abut that end. Damage to the tube ends, such as bends, tears, folds, and the like, tend to reduce the tube's internal diameter and otherwise interfere with the mounting of the tubes, with or without windings, on their respective spindles.

It is not unreasonable for several thousand tubes to be damaged during a given day's operation in a typical yarn spinning plant. By way of example, in one spinning facility 10,000 damaged tubes per day need to be either discarded or re-formed to an acceptable condition before reuse.

There are known apparatuses in use which ream the tube ends to restore the damaged core diameters and end faces to an acceptable reusable configuration. Such reaming apparatuses comprise a rotary driven reaming head. The reaming head includes a somewhat rounded mandrel extending from a collar rotatably driven by an electric motor. The mandrel has spaced peripheral axial grooves. One end of the tube is placed over the rotating mandrel until the edge of the tube abuts the collar. The head smooths and reshapes the tube inner core surface to the desired circular diameter and the collar squares the tube end. After one end is processed, that end is removed from the head and the other end is then inserted onto the head and processed similarly. This manual tube processing is costly and burdensome.

An automatic tube reaming apparatus for processing a damaged tube end according to the present invention comprises a first tube processing head adapted to receive one end of the tube aligned therewith for processing that one end. Head displacement means are coupled to the head for moving the head back and forth into a respective forward tube engagement position for processing an aligned tube, and into a rearward idle tube disengaged position. Tube feed means having a stationary idle state and a moving feed state include means for feeding a first tube into the alignment with the head and for ejecting a processed second tube from that alignment while in the feed state. Control means automatically cyclically place the feed means in the feed state when the head is in the rearward idle position and cyclically move the head into the forward and rearward positions while the feed means is idle.

Figure 8:
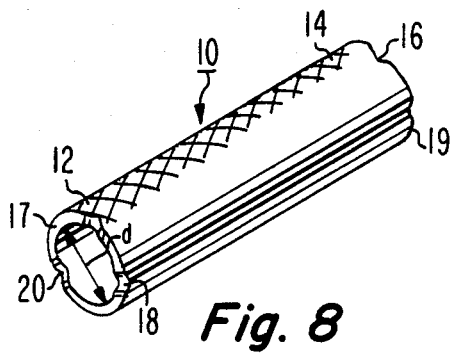
FIG. 8 is an isometric view of a tube to be processed by the apparatus of FIG. 1.

In FIG. 8, tube 10 is made of stiff paper board, as known in the yarn tube art, whose ends 12 and 14 during use in the yarn spinning process become damaged as at 16, 18, and 20. Damages 16, 18, and 20 include dents, deformations, tears, and so forth which tend to reduce the tube internal diameter d at one or both ends 12 and 14 and distort the tube end surfaces 17 and 19. The squareness of the plane of the end surfaces 17 and 19 with respect to the tube longitudinal axis and the size of diameter d are important since the tube core is required to be received by yarn spinning spindles (not shown) at each tube end.

Figure 1:
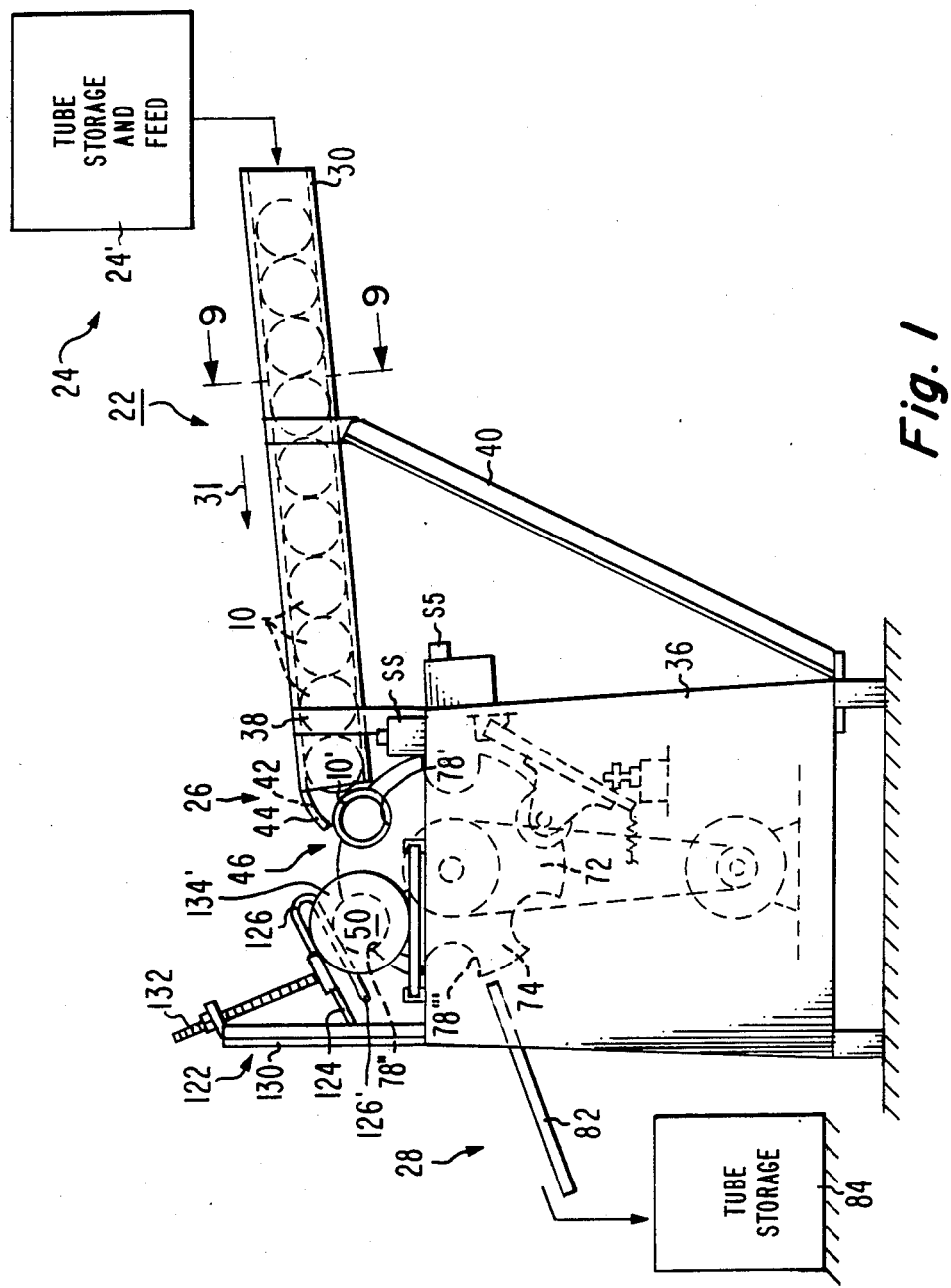
FIG. 1 is a side elevation view, partially schematic, of an apparatus in accordance with one embodiment of the present invention.

In FIG. 1, apparatus 22 processes a high volume of tubes 10 automatically and rapidly without human intervention restoring the internal diameter at the tube ends and squaring those ends with the tube's long axis. Apparatus 22 includes a tube storage and feed section 24, a tube processing section 26, and a processed tube storage section 28. The feed section 24 includes a tube storage and feed unit 24' which feeds tubes to an inclined chute 30. Unit 24' may comprise a vibratory hopper automated feed system (not shown) or a storage bin from which tubes are manually placed on chute 30. Chute 30 feeds tubes 10 with their long axes parallel and horizontal. Gravity (or the force of the vibratory feed system) forces the tubes down the chute incline in direction 31, feeding the tubes one at a time to the tube processing section 26.

Figure 9:
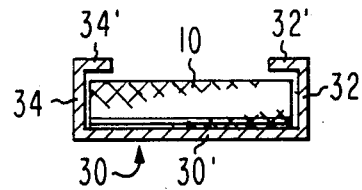
FIG. 9 is a sectional view of the feed chute of the embodiment of FIG. 1 taken long lines 9—9.

In FIG. 9, chute 30 comprises a bottom wall 30' and two upstanding L-shaped walls 32 and 34. Chute 30 is supported on the tube processing section 26 base 36 by braces 38 and 40. The spacing between the walls 32 and 34 is such to permit the damaged tubes 10 to roll down the chute without tilting, cocking, or otherwise binding in the chute. Walls 32 and 34 include overhanging lips 32' and 34' spaced sufficiently above the tubes to retain the tubes 10 within the chute 30 channel without binding.

Figure 2:
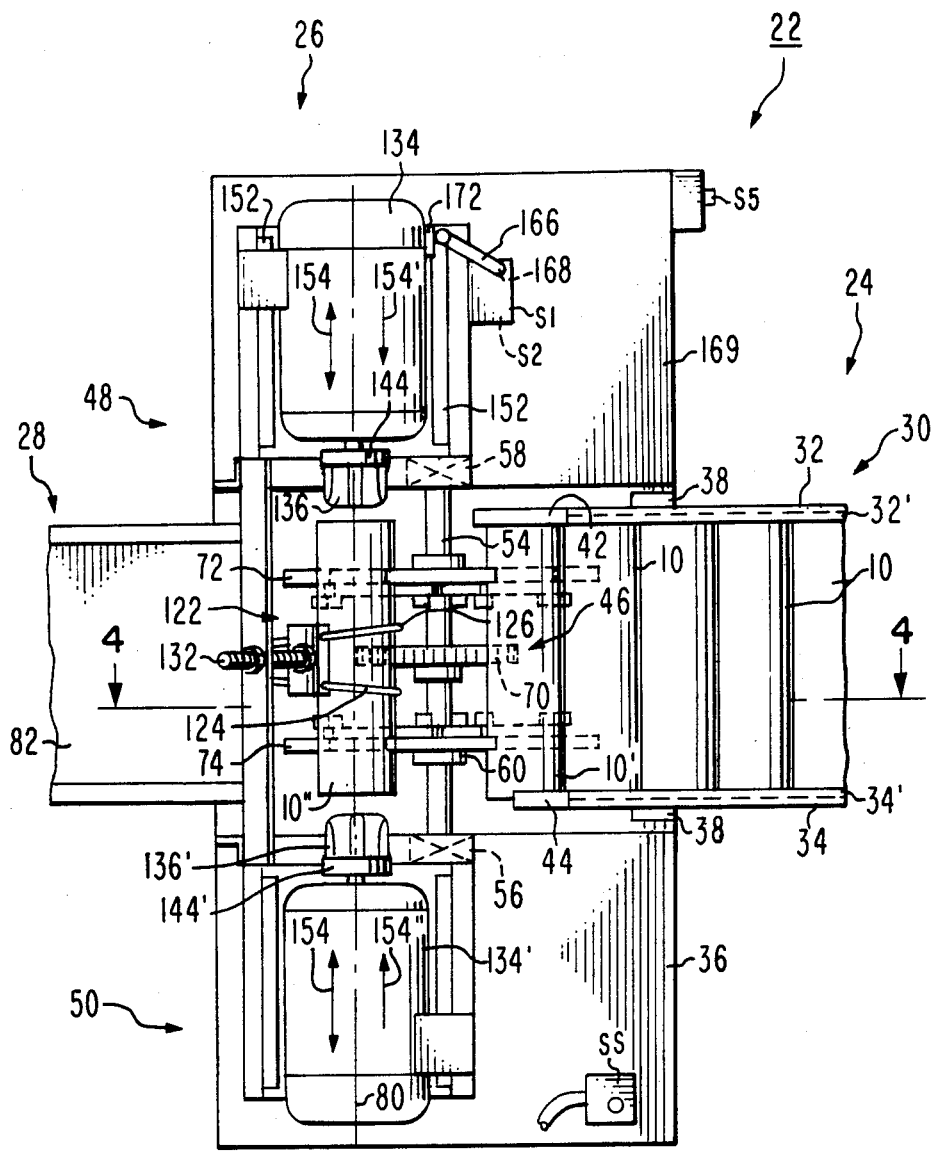
FIG. 2 is a plan view of the apparatus of FIG. 1.
Figure 3:
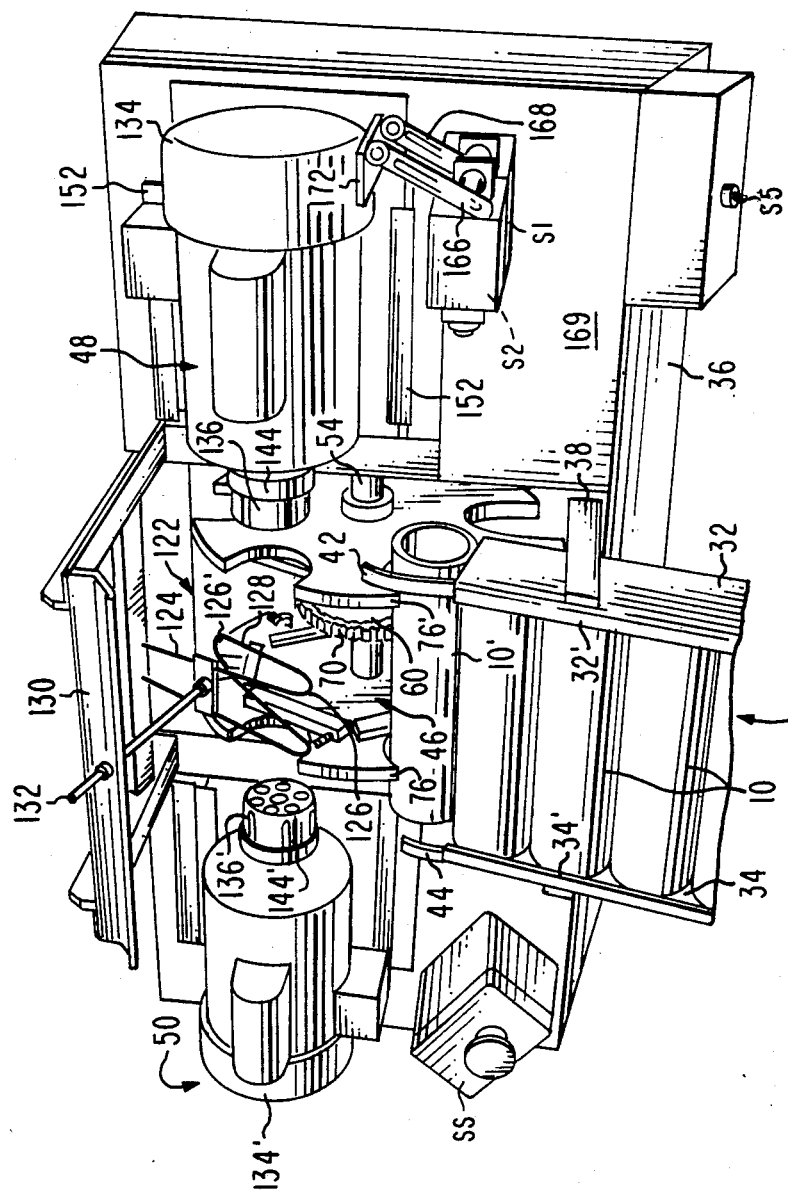
FIG. 3 is a perspective view of the apparatus of FIG. 1 taken above.

The tube processing section 26, FIG. 2, includes feed mechanism 46 and a pair of opposed, aligned tube processing assemblies 48 and 50. The feed mechanism 46 and the assemblies 48 and 50 are controlled and operated by circuit 52, FIG. 7. In FIG. 3, finger 42 extends from lip 32' and finger 44 extends from lip 34' of chute 30 for guiding lead tube 10' into alignment with the tube processing section 26 feed mechanism 46.

Figure 6:
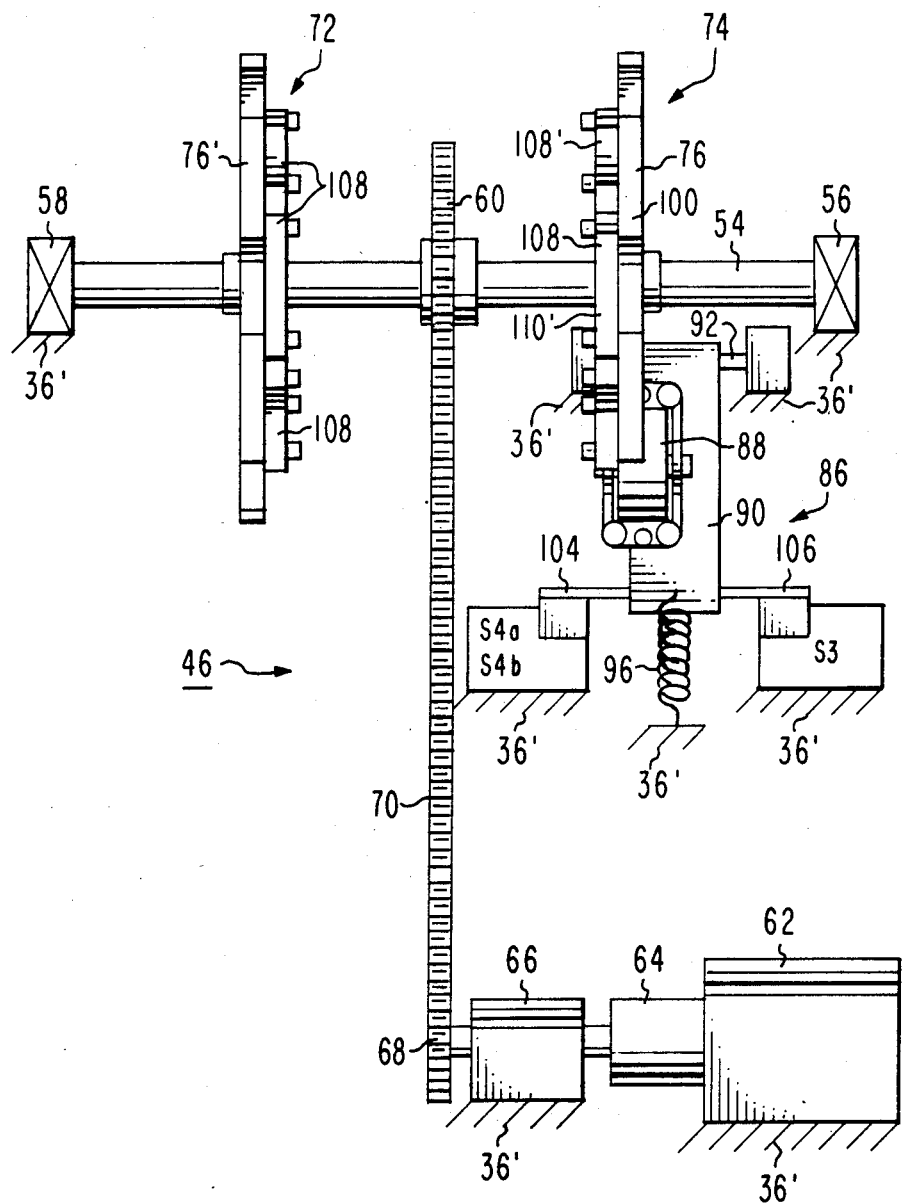
FIG. 6 is a rear elevation view, partially schematic, of the feed drum's drive system employed in the embodiment of FIG. 1.

In FIG. 6, the tube feed mechanism 46 comprises a shaft 54 secured at opposite ends to roller bearings 56 and 58 which are secured to base 36 represented by symbols 36'. Symbols 36' are used in the different FIGURES to represent the securing of the different related elements to base 36. Sprocket 60 secured to shaft 54, is controlled by index system 86. System 86 cyclically rotates shaft 54 in direction 120, FIG. 4, via chain 70 which couples drive sprocket 68 to driven sprocket 60. Sprocket 68 is driven by motor 62 through gear box 64, and selectively operated clutch 66, all secured to base 36. Clutch 66 is selectively engaged and disengaged by a control system to be described below which includes circuit 52, FIG. 7. A pair of identical feed wheel assemblies 72 and 74 are symmetrically secured to shaft 54 in mirror image relation on opposite sides of, equally spaced from, and driven by, sprocket 60.

Figure 4:
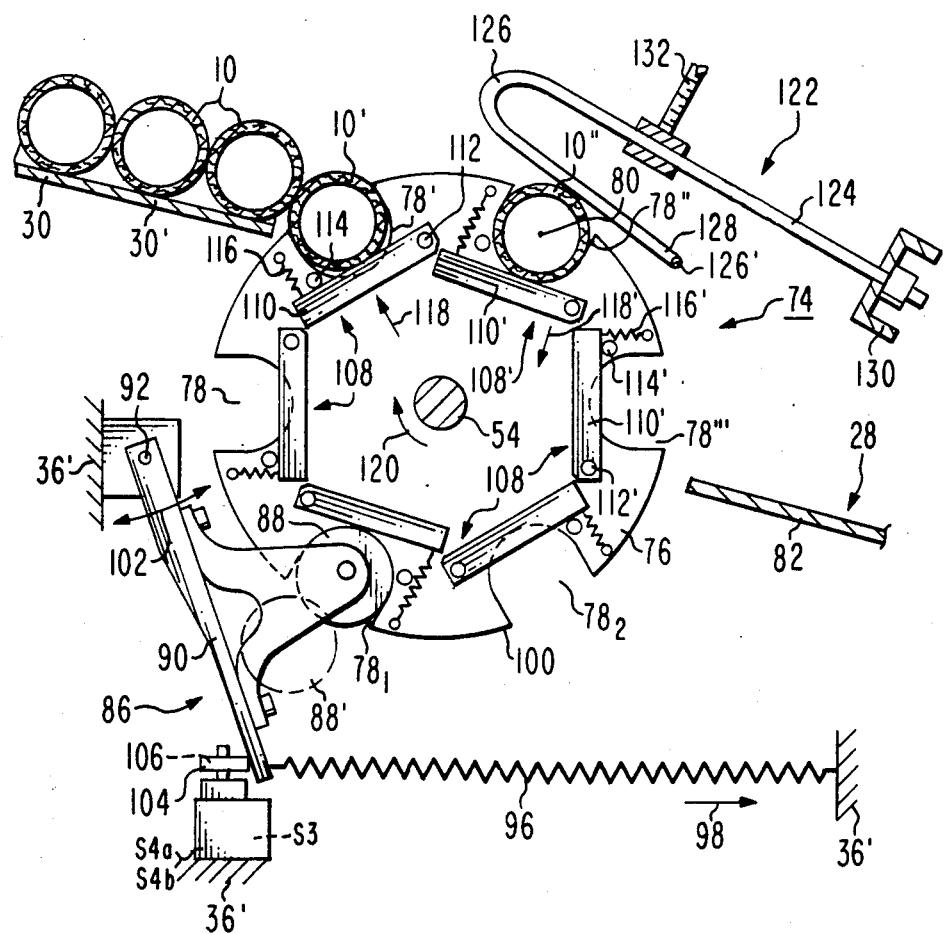
FIG. 4 is a sectional view illustrating the feed portion of the apparatus of FIG. 2 taken along lines 4—4.

In FIG. 4, representative feed assembly 74 comprises a disk-like tube carrier wheel 76 with a plurality of equally spaced, equally dimensioned, semicircular openings 78, 78'78", 78''', $78_1$ and $78_2$. Wheel 76, as illustrated, has six openings, but, in the alternative, it could have more or fewer openings in accordance with a given implementation. Each opening is dimensioned to closely receive and cradle a tube 10 therein, e.g., tube 10' in opening 78' and tube 10"0 in opening 78".

In FIG. 6, feed assemblies 72 and 74 are oriented with the tube receiving openings of their respective tube carrier wheels 76' and 76 aligned parallel to the longitudinal axis of shaft 54. This alignment permits a tube, such as tubes 10' and 10", FIG. 4, to be cradled in and carried horizontally simultaneously by the assemblies 72 and 74 in Ferris wheel fashion. The longitudinal axes of the so carried tubes are parallel to the longitudinal axis of the shaft 54 and axis 80 of the tube processing assemblies 48 and 50 (FIG. 2). The wheel assemblies 72 and 74, FIG. 2, are symmetrical relative to chute 30 so they can simultaneously receive and carry a tube from the chute. A tube is so received when one pair of openings of the aligned wheels 76 and 76', e.g., openings 78', FIG. 4, is aligned with chute 30 by index system 86.

In FIG. 4, the position of three openings 78', 78", and 78''' are of special interest. The following description of the alignment of a wheel 76 opening is intended to refer to a pair of aligned openings, one on each wheel 76' and 76, respectively, of feed assemblies 72 and 74. Opening 78' is adjacent to chute 30 to receive a tube 10' which rolls into the opening from the chute. Opening 78' is aligned on axis 80 to align a received tube 10" with the tube processing assemblies 48 and 50, FIG. 2. Opening 78''' locates a tube (not shown) for ejection from the wheel assemblies 72 and 74, FIG. 1, onto ejection chute 82 of section 28. Chute 82 feeds via gravity the processed tubes to a storage bin 84. In the alternative, chute 82 may be omitted and the tubes ejected directly into a storage bin.

In FIGS. 4 and 6, the mechanical parts of index system 86 comprise an index wheel 88 rotatably secured to a bracket 90 which is pivotally secured to base 36 by pivot pin 92. Wheel 88 is closely received and cradled in an adjacent aligned wheel 76 opening such as opening $78_1$. When opening $78_1$ is so aligned, opening 78" is aligned on axis 80 and opening 78' is adjacent chute 30. Bracket 90 and wheel 88 are pulled about pin 92 by tension spring 96 in direction 98 toward wheel 76. This pulling action forces the wheel 88 to roll along the wheel 76 peripheral surface 100. When the position of one of the openings in wheel 76, for example, opening $78_1$, is indicative of the one wheel 76 opening, e.g., opening 78", alignment on axis 80, wheel 88 rolls into that opening, e.g., opening $78_1$, one of directions 102, until fully seated.

Figure 7:
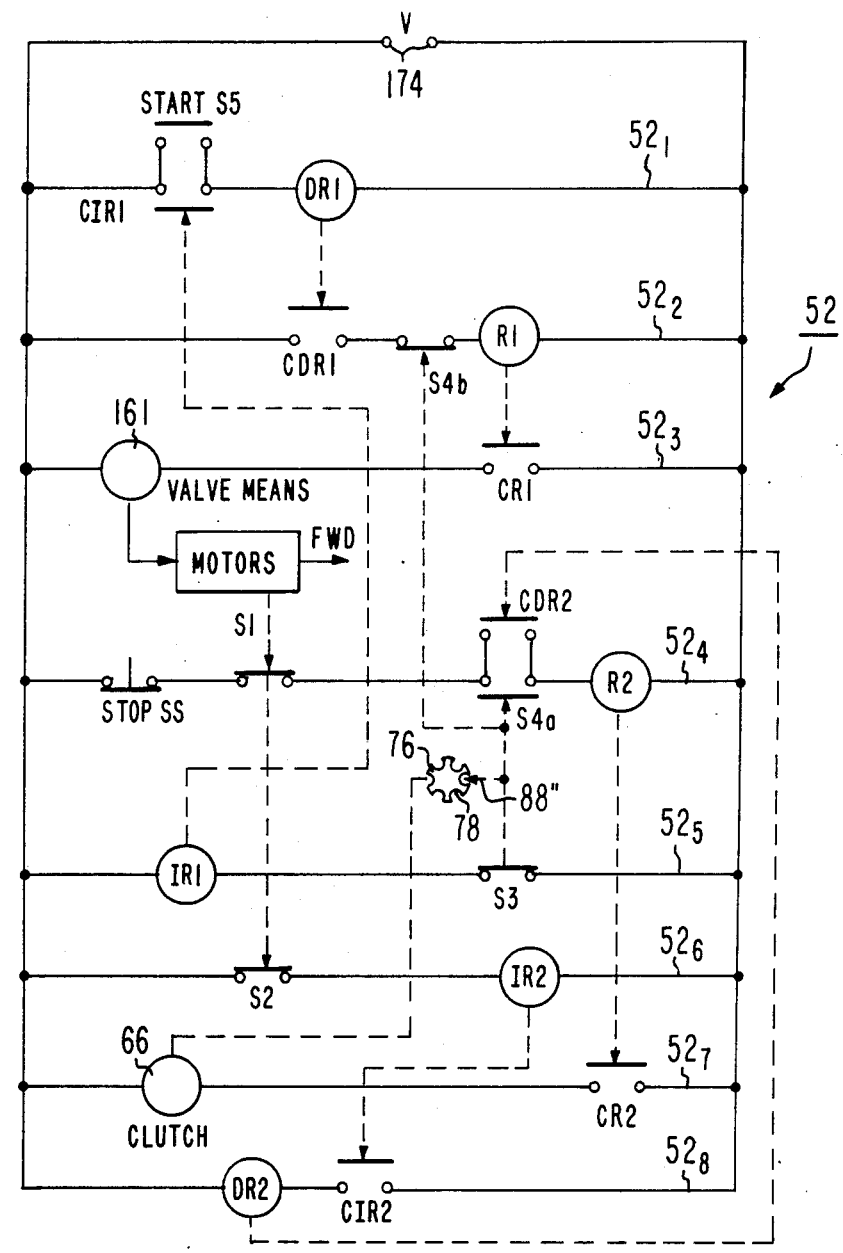
FIG. 7 is a schematic diagram of a circuit according to one embodient of the present invention.

In FIG. 6, index system 86 also includes three switches S3, S4a, and S4b, secured to base 36. Switches S4a and S4b are ganged and are operated by lever 104 and switch S3 is operated by lever 106. Levers 104 and 106 are positioned to engage bracket 90. When bracket 90 swings in directions 102, FIG. 4, in response to wheel 88 engaging or disengaging from a wheel 76 opening, the bracket 90 moves the levers 104 and 106 and operates the switches. Switches S3 and S4b are normally closed and switch S4a is normally open when wheel 88 is seated in one of the wheel 76 openings, FIG. 4. This condition is illustrated in FIG. 7 by arrow 88" which represents wheel 88. When the wheel 88, shown in phantom at 88', FIG. 4, rides along the feed wheel 76 peripheral surface 100, switches S3 and S4b are open and switch S4a is closed.

Adjacent to each wheel 76 opening (and the corresponding openings of wheel 76' of feed assembly 72, FIG. 6) is an identical tube eject mechanism 108. Representative eject mechanism 108 adjacent to opening 78' comprises lever arm 110 pivotally secured to wheel 76 by pivot pin 112, stop pin 114 secured to wheel 76 and a tension spring 116 which pulls lever 110 in direction 118 toward opening 78'. When a tube is not present in a wheel 76 opening such as at opening 78''', the lever arm normally abuts the stop pin. This causes the arm, e.g., arm 110', to overlap the opening in a radial direction away from shaft 54.

The force of the parade of tubes 10 on chute 30, FIG. 4, is insufficient to cause the lead tube 10' in opening 78' to resiliently pull on spring 116. Thus, tube 10', the initial tube in the parade, rests on arm 110 and is not fully seated in opening 78'. This is acceptable. Fingers 42 and 44 on the chute 30, FIG. 2, guide the lead tube 10', FIG. 4, into the opening 78' and against arm 110. Gravity retains the carried tube in the aligned feed wheel openings at this position. When wheel 76 is rotated clockwise, FIG. 4, in direction 120 by index system 86, tube 10' is kept in the mating feed wheel openings by gravity. It is important that the tube longitudinal axis be coaxial with the tube processing assembly's axis 80. For this reason, the tube 10" in this latter alignment must be fully seated against the wall of opening 78" and the eject mechanism 108' lever arm 110" at opening 78" must be moved out of position adjacent to opening 78" in direction 118'. Retainer 122 adjacent axis 80 so seats that tube, e.g., tube 10"

Retainer 122, FIGS. 3 and 4, comprises a stiff wire 124, for example, piano wire, bent at ends 126 and 126' to form a spring 128. Wire 124 is secured to a support structure 130 attached to base 36. The position and thus the force exerted by the spring 128 is set by an adjustable screw 132 threaded to support structure 130. The spring 128 is centrally disposed over the feed assemblies 72 and 74, FIG. 2. The spring 128 is spaced from wheel 76 (and wheel 76'), FIG. 4, an amount to resiliently engage and press against the next adjacent tube in a wheel opening as the wheel rotates that tube in direction 120 from the position of tube 10'. Spring 128 resiliently abuts a tube forcing it into alignment on axis 80, e.g., tube 10". Spring 128 forces that tube against the eject mechanism depressing the eject mechanism arm, e.g., arm 110", causing the tube to abut the wall of that aligned opening, accordingly. This action seats the tube in that opening as that tube approaches alignment with axis 80. This seating assures positive alignment of a tube to be processed with axis 80 and thus, the tube processing assemblies 48 and 50, FIG. 2.

Upon rotation of the wheel 76 (and wheel 76') in direction 120 by the index system 86, FIGS. 4 and 6, one wheel 76 opening such as opening 78" is rotated to the position illustrated by opening 78''' adjacent to chute 82. This rotation disengages a tube in a wheel opening, such as tube 10", from the retainer 122 and permits the eject arm 110' of the eject system 108 corresponding to that opening, e.g., opening 78''', to be released. The arm 110' resiliently pushes against a tube in that opening forcing the tube out of the opening onto the chute 82. A tube in any wheel 76 opening may be aligned on axis 80 and when cyclically positioned adjacent to chute 82 by indexing in direction 120, the tube in that latter opening is automatically ejected onto the chute 82.

Figure 5:
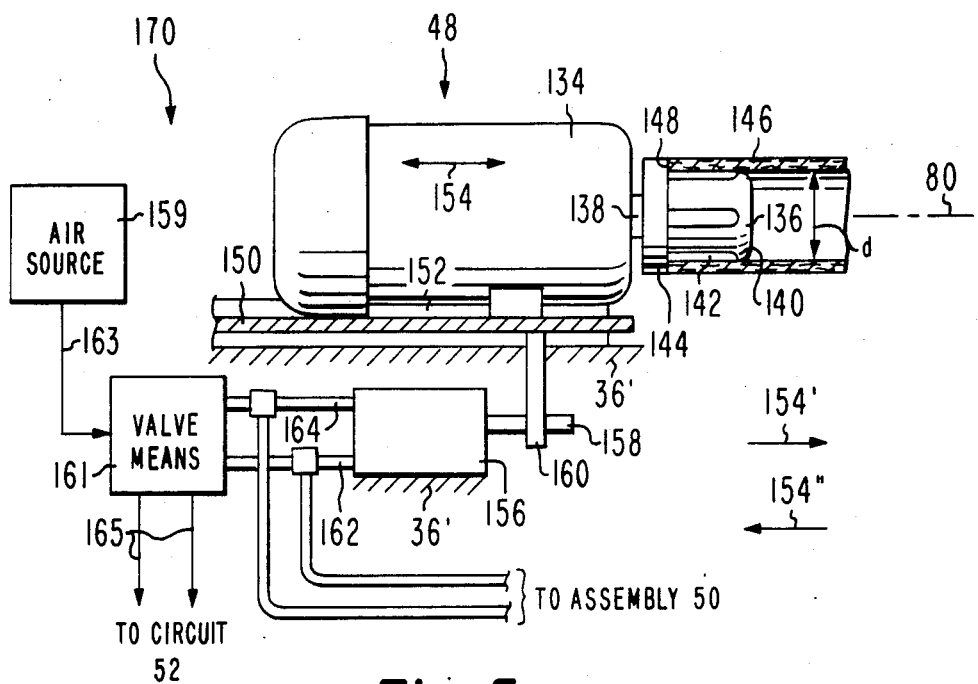
FIG. 5 is a side elevation view, partially in section and partially schematic, of one of the reaming head assemblies of the apparatus of FIG. 2.

In FIG. 2, assemblies 48 and 50 are identical in construction and the description of assembly 48 is representative. Assemblies 48 and 50 are secured to base 36 in mirror image relation. In FIG. 5, assembly 48 comprises a motor 134 which rotatably drives a reamer head 136 attached to the motor shaft 138. Head 136 is aligned on and rotates about axis 80. Head 136 is similar in construction to those commercially employed in this art. Head 136 includes a curved mandrel end surface 140 and a set of parallel grooves 142 spaced about the head peripheral surface and a collar 144 against which a tube 146 to be processed abuts. The peripheral surface of the head may also be knurled to assist in reaming the tube core surface. The head 136 has an outer diameter adjacent to collar 144 which is dimensioned to produce a finished internal diameter dimension d of the tube 146 to be reamed.

The grooves 142 and knurled surface enter the end of the tube and as the head 136 rotates, it wipes the tube edge surface 148 and the internal tube bore surface, minimizing the damages illustrated in FIG. 8 and reforming the tube core to diameter d and squaring the tube end surface with the tube longitudinal axis.

Motor 134 is secured to a plate 150 which slides in directions 154 parallel to axis 80 in ways 152, FIGS. 2 and 5, secured to base 36. The axis of rotation of head 136 is concentric with axis 80 as motor 134 slides in directions 154.

Pneumatic system 170, FIG. 5, simultaneously displaces motor 134 of assembly 48 with the displacement of motor 134' of assembly 50, FIG. 2, in directions 154. However, these motors are displaced concurrently in opposite directions. For example, when motor 134 moves in direction 154', motor 134' moves in direction 154". System 170, FIG. 5, includes a pneumatic air cylinder 156 secured to base 36. The cylinder 156 shaft is secured to plate 150 via bracket 160. Displacement of shaft 158 in directions 154 displaces plate 150 and motor 134 including head 136 accordingly.

Cylinder 156 is driven by pressurized air from source 159 through air line 163, valve means 161 and air lines 162 and 164. Lines 162 and 164 are also coupled to a similar cylinder (not shown) for displacing the motor 134' of assembly 50 (FIG. 2), which is secured to a sliding plate system similar to that of assembly 48. Valve means 161 includes an electrically operated valve system, for example, a four-way valve, responsive to electrical power received from circuit 52, FIG. 7. By way of example, the valve means, when comprised of a four-way valve (not shown), have a first quiescent state and a second electrically driven state. When electrical power is applied to the four-way valve, the valve switches states. When power is removed, the valve returns to its quiescent state. Valve means 161 in the quiescent state, with no power on input leads 165, FIG. 5, supplies pressurized air to cylinder 156 (and the corresponding cylinder of assembly 50) in a direction to force the motor 134 to its rearward position, direction 154" (and the motor 134' of assembly 50 in its rearward direction 154'). When electrical power is supplied leads 165, valve means switches states and applies pressurized air to force motor 134 in the opposite forward direction 154' (and motor 134' in its forward direction 154"). In this way, both ends of a tube such as tube 10", FIG. 2, are simultaneously processed. While a pneumatic system is illustrated in the present embodiment, the system could also be hydraulically operated or operated by mechanical mechanisms, e.g., cams, links, gears, and the like.

In FIGS. 2 and 3, a pair of ganged switches S1 and S2, are secured to plate 169 of base 36. The switches S1 and S2 have aligned operating levers 166 and 168. The levers 166 and 168 engage and are responsive to the position of plate 172 attached to the motor 134. When the motor 134 is rearward, FIG. 2, levers 166 and 168 engage plate 172 and close the respective S1 and S2 switches. When the motor 134 moves in the forward direction 154', levers 166 and 168 disengage from plate 172 opening switches S1 and S2. In FIG. 2, a manually operated push button switch S5, secured to base 36, is normally open for starting the system. A latching pushbutton, normally closed switch SS rests on base 36 and is used to stop the operation of the apparatus.

In FIG. 7, circuit 52 is powered by a voltage V which may be 110 VAC line voltage applied to terminals 174. Circuit 52 comprises a plurality of branch circuits $52_1$–$52_8$ coupled in parallel to terminals 174. Circuit $52_1$ comprises start switch S5 in parallel with contacts CIR1 of instantaneous relay IR1, whose coil is in 525, and in series with delay relay coil DR1. Relay IR1 is one which, when energized, momentarily closes and then opens its contacts CIR1. This relay is reset by deenergizing it. Delay relay DR1 is one whose normally open contacts CDR1, circuit $52_2$, close for a predetermined time interval when powered for a short duration, as by the momentary closing and opening of contacts CIR1 or by the momentary closing of start switch S5. Relay DR1 may close, for example, for a time delay of about two seconds, in one implementation. Circuit $52_2$ comprises the contacts CDR1 in series with normally closed switch S4b and relay R1. Circuit $52_3$ comprises the contacts CR1 of relay R1 in series with the solenoids (not shown) of valve means 161 of pneumatic system 170, FIG. 5. Circuit $52_4$ comprises stop switch SS in series with the normally closed switch S1 (when motor 134 is rearward), parallel connected switches comprising the normally open contacts CDR2 of delay relay DR2 (in circuit $52_8$) and switch S4a, and relay R2. Circuit $52_5$ comprises instantaneous relay IR1 whose contacts are in circuit $52_1$ described above, in series with normally closed switch S3.

Switches S3, S4a, and S4b are coupled to roller 88, arrow 88", FIG. 7. When roller 88 is seated in one of the feed wheel 76 openings, as mentioned above, switch S4a is open and switches S3 and S4b are closed. These switches change state, as explained above, when the roller 88 disengages from an opening and rolls on the exterior surface 100 of the wheel 76 (FIG. 4). Circuit $52_6$ comprises normally closed switch S2 (when motor 134 is rearward) in series with instantaneous delay relay IR2 whose normally open contacts CIR2 are in series with delay relay DR2 to form circuit $52_8$. Circuit $52_7$ comprises the windings of clutch 66 in series with the normally open contacts CR2 of relay R2. Clutch 66 is normally disengaged when contacts CR2 are open and engages when CR2 contacts close.

In operation, it is assumed power is applied to terminals 174, clutch 66 is disengaged, the feed wheels of the feed assemblies 72 and 74 are in an indexed position as illustrated in FIG. 4, the motors of assemblies 48 and 50 are in the rearward position illustrated in FIGS. 2 and 3 and the chute 30, FIG. 2, is loaded with tubes 10. Tubes 10 roll down the incline of chute 30, FIG. 1, until the initial tube 10' in the array falls into opening 78' of wheel assemblies 72 and 74.

An operator momentarily closes switch S5, FIG. 7, applying power to relay DR1. Relay DR1 contacts CDR1 close for a given time interval in response to receipt of the momentary power signal through the switch S5, for example, the two-second period mentioned above. Relay DR1 applies power to relay R1 through closed switch S4b for its preset time interval. Relay R1 contacts CR1 close powering the solenoids of valve means 161. Valve means 161 apply air pressure to the assemblies 48 and 50, cylinders 156 (FIG. 5, one being shown) moving the respective motors 134 and 134', FIG. 2, forward to the tube processing positions. At the time the start switch S5 is pressed, the contacts of switch S4a and CDR2 of delay relay DR2 are open and no power is applied to relay R2, clutch 66 is thus disengaged. This maintains the feed wheel assemblies 72 and 74, FIG. 2, in the position of FIG. 4. As the head motors move forward in the tube processing portion of the cycle for the period determined by relay DR1, switches S1 and S2 levers disengage from plate 172, FIG. 2, opening switches S1 and S2, FIG. 7. The opening of switch S2 resets the instantaneous delay relay IR2. The opening of switch S1 assures that relay R2 cannot be powered. This is a safety to prevent the clutch 66 from moving the feed wheel assemblies, which are stationary at this time, while the motors are forward. Meanwhile, power is being supplied to the head motors to rotate the heads and to the clutch motor at all times. The reaming heads 136 and 136', FIG. 2, engage and ream opposite ends of a given tube aligned on axis 80, for example, tube 10", when the motors move forward. If no tube is in position to be reamed, the motors still move forward and operate.

At the end of the time period set by the delay relay DR1, its contacts CDR1 open, cutting off power to relay R1 and to the valve means 161, switching the state of valve means 161, moving the motors rearward. The motors are timed by relay DR1 to remain forward for a sufficient time interval to process a tube. When the motors move rearward at the end of the period set by relay DR1, they engage the levers 166 and 168 of respective switches S1 and S2, FIG. 2, closing those switches. The closing of switch S2 applies power to instantaneous relay IR2, circuit 52$_6$, momentarily closing its contacts CIR2 in circuit 52$_8$. This starts delay relay DR2 for its delayed time period, closing its contacts CDR2 for a preset time period. Delay relay DR2 may have a time period of about a fraction of a second. This period is sufficiently long to overlap the closing of switch S4a as described next.

The closing of contacts CDR2 in circuit 52$_4$ applies power through the stop switch SS and now closed switch S1 to relay R2 closing its contacts CR2. The closing of contacts CR2 engages clutch 66 coupling drive motor 62 to drive sprocket 68, FIG. 6. This rotates the feed wheels 76' and 76 in direction 120, FIG. 4. The rotation of the wheels 76 and 76', disengages wheel 88 from the then aligned wheel 76 opening, and displaces lever 90, closing switch S4a and opening switches S3 and S4b. The opening of switch S3 removes power from instantaneous relay IR1, resetting it for operation when switch S3 later closes. The opening of switch S4b removes power from relay R1 as a safety and prevents the head motors from moving forward while the feed assembly wheels are rotating in the feed state portion of a cycle. The closing of switch S4a applies power to relay R2 so its contacts CR2 apply power to the clutch 66 when contacts CDR2 open after the period determined by relay DR2 ends.

The closed switch S4a continues to apply power to relay R2 as long as the feed wheels are out of their indexed position. In the meantime, the time delay relay DR1 has timed out for its time period opening its contacts CDR1 while S4b is open. Switch S4b remains open for the entire duration that the feed wheels rotate. When the next wheel opening, for example, opening 78$_2$, FIG. 4, reaches the position of wheel 88, wheel 88 engages that opening and the feed wheels are in the next indexed position with an opening aligned on axis 80.

When wheel 88 engages that opening, bracket 90 operates levers 104 and 106, FIG. 6, of respective switches S4a and S4b and S3. Switch S4a opens and switches S3 and S4b close. Closed switch S3 provides power to instantaneous delay relay IR1 momentarily closing its contacts CIR1 in circuit 52$_1$ providing power to delay relay DR1. This closes the contacts CDR1 in circuit 52$_2$ for the period set by relay DR1 and power is applied to relay R1 because switch S4b is now closed. The closing of switch S4b energizes relay R1 which causes the motors to move forward, as discussed above. The opening of switch S4a removes power from relay R2, removing power from clutch 66, disengaging the clutch and stopping the feed assemblies 72 and 74 in that indexed position. This completes one cycle which then repeats automatically.

A tube sensor (not shown) can be used to sense the absence of tubes on chute 30 to automatically stop the cycle by opening circuit 52$_4$. Upon completion of the processing of all of the tubes on chute 30, the on-off stop switch, switch SS, FIGS. 2 and 7 is manually opened. This opens the circuit to relay R2 stopping the clutch and the system. Later closing switch SS restarts the system from the position in the cycle where stopped. In this way, a large number of tubes can be processed automatically and quickly, with little operator intervention. By way of example, an apparatus according to the present invention may process 10,000 tubes in a single day. This processing represents a substantial cost saving over prior art manual methods.

What is claimed is:

1. Automatic tube processing apparatus for refinishing damaged tube ends comprising:
   a first tube processing head adapted to be received in an end of said tube aligned therewith for processing said tube at said end;
   a second tube processing head aligned with and facing the first head adapted to be received in the other end of said tube for similarly processing said other end;
   head displacement means coupled to said heads for moving said heads back and forth into a respective forward tube engagement position for processing an aligned tube and into a rearward idle tube disengaged position;

tube feed means having a stationary idle state and a moving feed state including means for feeding a first tube into said alignment with said heads and for ejecting a processed second tube from that alignment during said feeding in said feed state, said feed means including a feed chute and a cyclically rotatably driven tube feed wheel having a plurality of like openings equally spaced about and in radial communication with the periphery of the wheel, said wheel being positioned relative to said chute and heads such that a tube fed to said wheel from said chute is held in a corresponding one of said openings by the force of gravity as the wheel when rotated feeds that held tube into said alignment with said heads; and control means for automatically cyclically rotating said wheel in the feed state when said heads are in said rearward idle position and for cyclically moving said heads into said forward and rearward positions while said wheel is idle, said control means including means for cyclically simultaneously moving said heads in opposite directions for simultaneously processing opposite ends of said aligned tube in one cycle, said control means including a closed circuit feedback system comprising switches and relays for operating said displacement means and feed means, said system comprising first and second switch means each including at least one switch having open and closed switch states, said first switch means being responsive to the forward and rearward positions of said heads, said second switch means being responsive to the alignment position of each of said wheel openings with said heads, and time delay relay means including operating coils and contacts responsive to the energized state of said coils, said contacts having selected opened and closed states in predetermined time intervals when the corresponding coils are energized, said time delay relay means being in circuit with and responsive to the switch states of said first and second switch means for automatically alternately operating the head displacement means and wheel in accordance with the state of said switches and said contacts.

2. The apparatus of claim 1 wherein said wheel includes at least three annularly spaced openings, said openings being related such that at any given time of a cycle when the feed means are idle, a first opening is positioned for receiving a first fed tube in said given alignment, a second opening is positioned for aligning a second tube with said heads, and a third opening is positioned for placing a processed third tube in a tube ejection position, each said at least three openings including tube ejection means coupled thereto for automatically ejecting the corresponding mating tube when that opening is moved to the ejection position.

3. The apparatus of claim 1 wherein said control means includes a plurality of parallel circuits, said parallel circuits comprising:

(a) a first time delay relay coil in series with the contacts of a first instaneous relay;

(b) the contacts of said first time delay relay in series with the coil of a first non-delay relay and a switch of said second switch means;

(c) said head displacement means includes valve means for operating the heads in series with the contacts of said first non-delay relay;

(d) one switch of said first switch means being in series with the contacts of a second time delay relay and the coil of a second non-delay relay, said second time delay relay contacts being in parallel with a second switch of said second switch means;

(e) the coil of said first instantaneous relay being in series with a third switch of said second switch means;

(f) a second switch of said first switch means being in series with a coil of a second instantaneous relay;

(g) said tube feed means including wheel drive clutch means in series with the contacts of said second non-delay relay; and (h) the coil of the second time delay relay being in series with the contacts of said second instantaneous relay.

4. An automatic tube processing apparatus comprising:

a support;

a pair of aligned rotating tube processing heads secured to the support for coaxial displacement, each head for processing a different end of a given tube, said processing including reaming an internal surface at said different end and refinishing the tube edge at said different end;

head drive means secured to the support for moving the heads in opposite aligned directions to a forward tube process state toward each other and a rearward idle state away from each other;

feed means having a feed state and an idle state for placing one tube at a time into alignment with said heads while the heads are idle in the rearward state during the feed state, said feed means including means for moving a second processed tube from said alignment with said heads during said placing; said feed means including a feed chute and a cyclically rotatably driven tube feed wheel having a plurality of like openings equally spaced about and in radial communication with the periphery of the wheel, said wheel being positioned relative to said chute and heads such that a tube fed to said wheel from said chute is held in a corresponding one of said openings by the force of gravity as the wheel when rotated feeds that held tube into said alignment with said heads;

ejection means secured to the wheel for automatically ejecting a third processed tube from said wheel; and control means for automatically periodically operating said head drive means alternately with the operation of said feed means and said ejection means, said control means including a closed circuit feedback system comprising switches and relays for operating said displacement means and feed means, said system comprising first and second switch means each including a plurality of switches having open and closed switch states, said first switch means being responsive to the forward and rearward positions of said heads, said second switch means being responsive to the alignment position of each of said wheel openings with said heads, and time delay relay means including operating coils and contacts responsive to the energized state of said coils, said contacts having selected opened and closed states in predetermined time intervals when the corresponding coils are energized, said delay relay means being in circuit with and responsive to the switch states of said first and second switch means for automatically alternately operating the head displacement means and wheel in accordance with the state of said switches and said contacts.

5. The apparatus of claim 4 wherein said feed means includes a motor secured to the support for driving the wheel through a clutch, said first switch means being adapted for selectively disengaging and engaging the clutch in accordance with the sensed position of the heads and the second switch means being adapted for sensing the position of a second one of said openings for selectively operating said head drive means when said second one opening is indicative of the alignment of the one opening with said heads.

6. The apparatus of claim 4 wherein said wheel includes tube ejection means coupled to each opening for resiliently ejecting a tube from that opening, said wheel being arranged such that when said one opening is aligned with said heads, a second of said said openings is aligned to receive a tube in a tube idle position and a third of said openings is aligned in a tube ejection position, said apparatus including tube retaining means adapted for retaining a tube in said head alignment position opening and for selectively permitting a tube to be ejected from its corresponding opening in the tube ejection position.

7. Automatic tube processing apparatus comprising:
first and second axially aligned tube processing heads each adapted for simultaneously processing a different end of a tube aligned therewith;
head displacement means coupled to the heads for selectively simultaneously moving the heads into a forward tube processing position and a rearward idle tube disengaged position;
first and second switches coupled to the heads and having closed switch states when the heads are rearward and open switch states when the heads are forward;
a tube feed wheel having a plurality of equally spaced like tube receiving and carrying peripheral openings;
drive means for rotating the wheel;
a chute for feeding tubes one at a time to said wheel, said wheel being arranged so that one opening is aligned with the chute when a second opening is aligned with said heads;
third, fourth, and fifth switches coupled to the wheel, the third and fourth switches being closed when one of said openings is aligned with said heads and open when the openings are misaligned with said heads, the fifth switch having an opposite switch state as said third and fourth switches; and
relay means in circuit with said switches, for selectively operating said head displacement means to automatically place the heads in the forward and then in the rearward positions when the third and fourth switches are closed and the fifth switch is open and for then operating the wheel drive means for rotating the wheel when the first and second switches are closed to thereby open the third and fourth switches and close the fifth switch and automatically stopping the wheel when said third and fourth switches close and the fifth switch opens after an opening becomes aligned with said heads.

8. The apparatus of claim 7 further including an instantaneous relay in circuit with one of said first and second switches for momentarily closing the circuit to said wheel drive means for a time interval sufficient to open said third and fourth switches and close said fifth switch, said fifth switch when closed being coupled to power said wheel drive means.

* * * * *